United States Patent
Obara et al.

(10) Patent No.: US 10,534,641 B2
(45) Date of Patent: Jan. 14, 2020

(54) ELECTRONIC DEVICE THAT USES HARDWARE CORRESPONDING TO PRIORITY LEVEL OF PROCESSOR USAGE

(71) Applicant: KYOCERA Document Solutions Inc., Osaka (JP)

(72) Inventors: Shuhei Obara, Osaka (JP); Wataru Sunami, Osaka (JP); Satoshi Hayama, Osaka (JP); Yoshitaka Matsuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 244 days.

(21) Appl. No.: 15/600,106

(22) Filed: May 19, 2017

(65) Prior Publication Data

US 2017/0344501 A1 Nov. 30, 2017

(30) Foreign Application Priority Data

May 30, 2016 (JP) .................................. 2016-107378
May 30, 2016 (JP) .................................. 2016-107381

(51) Int. Cl.
*G06F 9/48* (2006.01)
*G06F 13/26* (2006.01)
*G06F 3/12* (2006.01)
*G06F 9/00* (2006.01)
*G06F 9/50* (2006.01)
*G06F 13/18* (2006.01)

(52) U.S. Cl.
CPC ............ *G06F 9/4881* (2013.01); *G06F 3/126* (2013.01); *G06F 3/1261* (2013.01); *G06F 3/1263* (2013.01); *G06F 3/1286* (2013.01); *G06F 3/1287* (2013.01); *G06F 9/00* (2013.01); *G06F 9/48* (2013.01); *G06F 9/4843* (2013.01); *G06F 9/5038* (2013.01); *G06F 13/18* (2013.01); *G06F 13/26* (2013.01)

(58) Field of Classification Search
None
See application file for complete search history.

(56) References Cited

U.S. PATENT DOCUMENTS

| | | | | |
|---|---|---|---|---|
| 9,162,441 | B1 * | 10/2015 | Noda | B41J 2/2132 |
| 2008/0071947 | A1 * | 3/2008 | Fischer | G06F 13/24 |
| | | | | 710/48 |
| 2016/0132357 | A1 * | 5/2016 | Kuraishi | G06F 9/5038 |
| | | | | 718/101 |

FOREIGN PATENT DOCUMENTS

JP 2006-260377 A 9/2006

\* cited by examiner

*Primary Examiner* — Francisco J Aponte
*Assistant Examiner* — Mark A Gooray
(74) *Attorney, Agent, or Firm* — Stein IP, LLC

(57) ABSTRACT

An electronic device includes a CPU that executes the process execution program to function as a plurality of process execution units as threads and an execution control unit. The plurality of process execution units use the CPU to execute a process. The execution control unit controls executing of the process by the plurality of process execution units. The execution control unit sets a CPU usage priority level for each of the plurality of process execution units. The execution control unit changes the CPU usage priority level of the job of a type other than a specific type to a priority level that is equal to or less than a specific priority level, when the job of the specific type and the job of the type other than the specific type are simultaneously executed.

6 Claims, 13 Drawing Sheets

17c

| Job | Thread | CPU Usage Priority Level |
|---|---|---|
| Copy Job | Thread A | 5 |
|  | Thread B | 10 |
|  | Thread C | 20 |
| Print Job | Thread X | 0 |
|  | Thread Y | 10 |
|  | Thread Z | 15 |
| ⋮ | ⋮ | ⋮ |

*FIG. 2*

ELECTRONIC DEVICE THAT USES HARDWARE CORRESPONDING TO PRIORITY LEVEL OF PROCESSOR USAGE

INCORPORATION BY REFERENCE

This application is based upon, and claims the benefit of priority from, corresponding Japanese Patent Application Nos. 2016-107378 and 2016-107381, each filed in the Japan Patent Office on May 30, 2016, the entire contents of which are incorporated herein by reference.

BACKGROUND

Unless otherwise indicated herein, the description in this section is not prior art to the claims in this application and is not admitted to be prior art by inclusion in this section. There has been known a typical electronic device that includes a processor that performs a task, and a peripheral hardware connected to the processor to execute processes. The typical electronic device reduces a priority level of a processor usage by the task that has caused the peripheral hardware to execute the processes.

SUMMARY

An electronic device according to one aspect of the disclosure executes a plurality of types of a job. The electronic device includes a Central Processing Unit (CPU), and a storage unit that stores a process execution program. The CPU executes the process execution program, and functions as a plurality of process execution units as threads and an execution control unit. The plurality of process execution units use the CPU to execute a process. The execution control unit controls executing of the process by the plurality of process execution units. The execution control unit sets a CPU usage priority level for each of the plurality of process execution units. The execution control unit changes the CPU usage priority level of the job of a type other than a specific type to a priority level that is equal to or less than a specific priority level, when the job of the specific type and the job of the type other than the specific type are simultaneously executed.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2 illustrates exemplary CPU usage priority level information according to the one embodiment;

DETAILED DESCRIPTION

Figure 1:
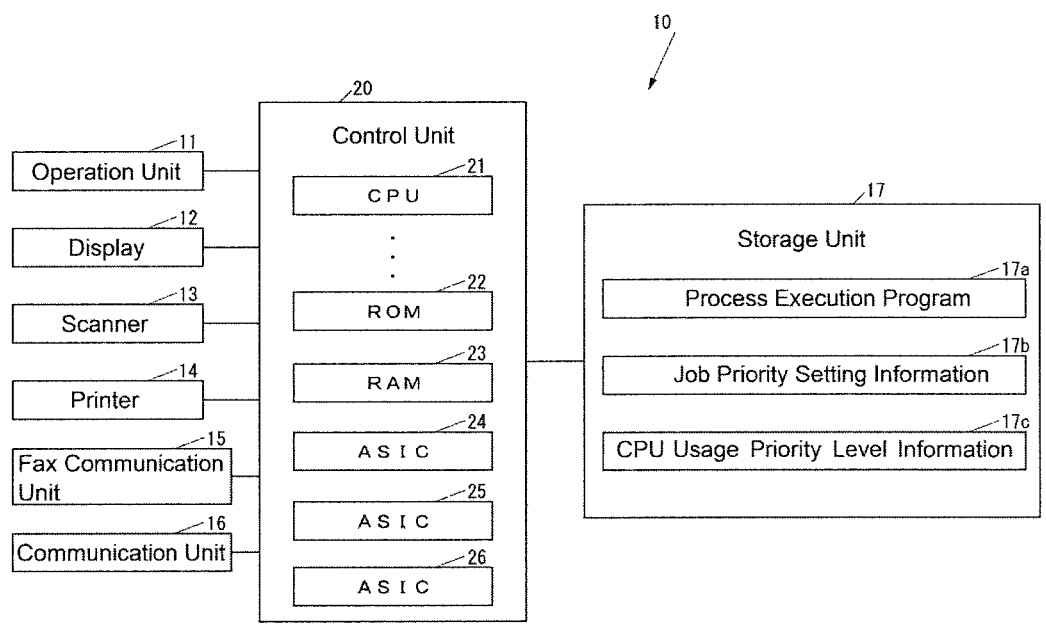
FIG. 1 illustrates a block diagram of an MFP according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure by referring to the drawings.

First, a description will be given of a configuration of a Multifunction Peripheral (MFP) as an electronic device according to the embodiment.

FIG. 1 illustrates a block diagram of an MFP 10 according to one embodiment of the disclosure.

As illustrated in FIG. 1, the MFP 10 includes an operation unit 11, a display 12, a scanner 13, a printer 14, a fax communication unit 15, a communication unit 16, a storage unit 17, and a control unit 20. The operation unit 11 is an input device such as buttons for inputting various kinds of operations. The display 12 is a display device such as a Liquid Crystal Display (LCD) for displaying various kinds of information. The scanner 13 is a reading device for reading an image from an original document. The printer 14 is a print device for printing the image on a recording medium such as a paper sheet. The fax communication unit 15 is a facsimile device for carrying out fax communication with an external fax device (not illustrated) via a communication line such as a dial-up line. The communication unit 16 is a communication device for communicating with external devices via a network such as Internet and a Local Area Network (LAN) or communicating directly by a wired communication or a wireless communication without via the network. The storage unit 17 is a non-volatile storage device such as a semiconductor memory and a Hard Disk Drive (HDD) for storing various kinds of information. The control unit 20 controls overall operation of the MFP 10.

The storage unit 17 stores a process execution program 17a for executing processes in the MFP 10. The process execution program 17a may be installed in the MFP 10 at the production stage of the MFP 10, may be additionally installed in the MFP 10 from an external storage medium such as a SD card or a Universal Serial Bus (USB) memory, or may be additionally installed in the MFP 10 from the network.

The storage unit 17 is configured to store job priority setting information 17b that indicates a setting of a job type preferentially executed by the MFP 10. Hereinafter, the job type preferentially executed by the MFP 10 is referred to as "a priority job type." In default, the job priority setting information 17b does not indicate the priority job type.

The storage unit 17 stores a CPU usage priority level as CPU usage priority level information 17c. The CPU usage priority level is a processor usage priority level as a priority level of the use of a Central Processing Unit (CPU) 21 described below by a thread 21a (see FIG. 3) described below. The CPU usage priority level information 17c is indicated by each type of the thread 21a set by each job type. Here, the CPU usage priority level is an integer of 0 or more, and high as the value increases.

FIG. 2 illustrates exemplary CPU usage priority level information 17c.

The CPU usage priority level information 17c indicated in FIG. 2 includes CPU usage priority levels of respective threads of "a copy job" where the printer 14 prints an image read from an original document by the scanner 13 on a recording medium, and CPU usage priority levels of respective threads of "a print job" where the printer 14 prints an image based on print data such as print data received via the communication unit 16 on a recording medium. However, in practice, the CPU usage priority level information 17c includes CPU usage priority levels of respective threads of job types other than the copy job and the print job, for example, "a transmitting job" where an image such as the image read from the original document by the scanner 13 is transmitted via the communication unit 16.

The CPU usage priority level information 17c illustrated in FIG. 2 includes threads A, B, and C as the threads of the copy job. The thread A is, for example, a thread for reading the image from the original document by the scanner 13 to generate drawing data corresponding to the read image. The thread B is, for example, a thread for writing the drawing data generated by the thread A on a Random Access Memory (RAM) 23 described below. The thread C is, for example, a thread for reading the drawing data written on the RAM 23 by the thread B from the RAM 23 to print on a recording medium by the printer 14. The threads A, B, and C are configured to have a higher CPU usage priority level as the thread is executed later in the job. That is, the CPU usage priority level of the thread C is configured to be higher than the CPU usage priority level of the thread B, and the CPU usage priority level of the thread B is configured to be higher than the CPU usage priority level of the thread A. The reason is as follows. For example, when a plurality of jobs are executed in same time period, it takes a long time for a thread to be executed later in the job to be executed, and the result of the process by a thread executed early in the job is excessively accumulated in the RAM 23, thus generating an error of capacity shortage of the RAM 23. The copy job may include threads other than the threads A, B, and C.

The CPU usage priority level information 17c illustrated in FIG. 2 includes threads X, Y, and Z as the threads of the print job. The thread X is, for example, a thread for generating the drawing data corresponding to the print data. The thread Y is, for example, a thread for writing the drawing data generated by the thread X on the RAM 23 described below. The thread Z is, for example, a thread for reading the drawing data written on the RAM 23 by the thread Y from the RAM 23 to print on a recording medium by the printer 14. The threads X, Y, and Z are configured to have a higher CPU usage priority level as the thread is executed later in the job. That is, the CPU usage priority level of the thread Z is configured to be higher than the CPU usage priority level of the thread Y, and the CPU usage priority level of the thread Y is configured to be higher than the CPU usage priority level of the thread X. The reason is similar to the above-described reason for the threads A, B, and C of the copy job. The print job may include threads other than the threads X, Y, and Z.

As illustrated in FIG. 1, the control unit 20 includes, for example, a plurality of CPUs 21 as processors, a Read Only Memory (ROM) 22 storing programs and various kinds of data, and the RAM 23 used as a work area of the CPU 21, and Application Specific Integrated Circuits (ASICs) 24, 25, and 26 as hardware for executing specific processes. The CPU 21 executes the programs stored in the ROM 22 or the storage unit 17.

The ASIC 24 is hardware, for example, that executes a process for reading the image from the original document by the scanner 13. The ASIC 25 is hardware, for example, that executes a process for rotating the image read by the ASIC 24 to change a direction of the image. The ASIC 26 is hardware, for example, that executes a process of a color conversion on the image whose direction is changed by the ASIC 25. The process executed by each of the ASICs 24 to 26 is performed at a high speed compared with a case achieved by the execution of software by the CPU 21.

Figure 3:
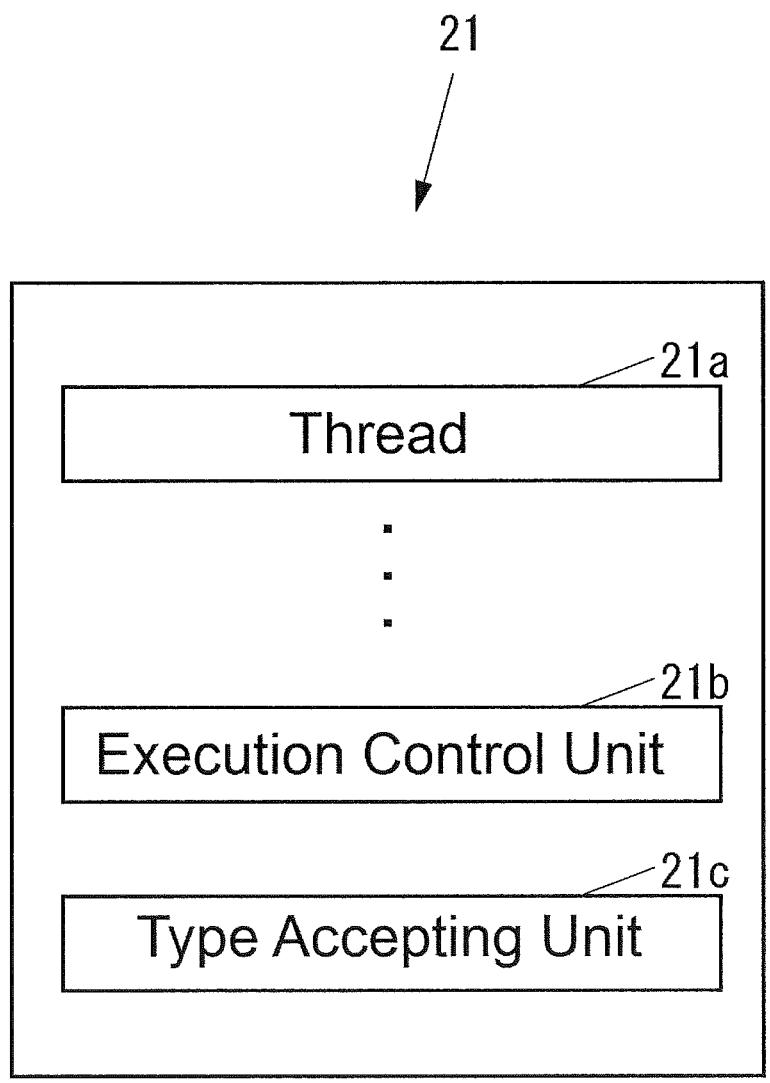
FIG. 3 illustrates a block diagram of a function achieved by a CPU according to the one embodiment.

FIG. 3 illustrates a block diagram of a function achieved by the CPU 21.

The CPU 21 executes the process execution program 17a stored in the storage unit 17, so as to function as, as illustrated in FIG. 3, the plurality of threads 21a as process execution units that use the CPU 21 to execute the process, an execution control unit 21b that controls the execution of the process by the thread 21a, and a type accepting unit 21c that accepts a designation of the priority job type.

The execution control unit 21b writes CPU usage priority level information that includes content identical to the CPU usage priority level information 17c on the RAM 23, and subsequently sets a CPU usage priority level based on the CPU usage priority level information on the RAM 23 by each thread 21a. The execution control unit 21b is configured to cause the thread 21a to use the CPU 21 in an order from the high CPU usage priority level. That is, the execution control unit 21b causes a target thread 21a to wait when threads 21a with high CPU usage priority levels compared with the target thread 21a use all the CPUs 21. When the number of the CPUs 21 is greater than the number of the threads 21a whose CPU usage priority levels are high compared with the target thread 21a, and the number of CPUs 21 is smaller than the number of the threads 21a (including the target thread 21a) whose CPU usage priority levels are equal to or more than the CPU usage priority level of the target thread 21a, the execution control unit 21b includes any of following settings: a setting (timesharing) where every thread 21a (including the target thread 21a) with the CPU usage priority level identical to the target thread 21a alternately uses the CPUs 21 not used by the threads 21a with the CPU usage priority levels higher than the CPU usage priority level of the target thread 21a in a short time, or a setting (first-come basis) where the threads 21a (including the target thread 21a) with the CPU usage priority levels identical to the target thread 21a use the CPUs 21 not used by the threads 21a with the CPU usage priority levels higher than the CPU usage priority level of the target thread 21a in order. However, when the CPU usage priority level of the target thread 21a is 0, and the number of the CPUs 21 is greater than the number of the threads 21a whose CPU usage priority levels are 1 or more and the number of the CPUs 21 is smaller than the number of the threads 21a whose CPU usage priority levels are 0 or more, the execution control unit 21b causes every thread 21a whose CPU usage priority level is 0 to alternately use the CPUs 21 not used by the threads 21a whose CPU usage priority levels are 1 or more in a short time (timesharing).

Next, the operation of the MFP 10 will be described.

First, the operation of the MFP 10 for setting the priority job type will be described.

Figure 4:
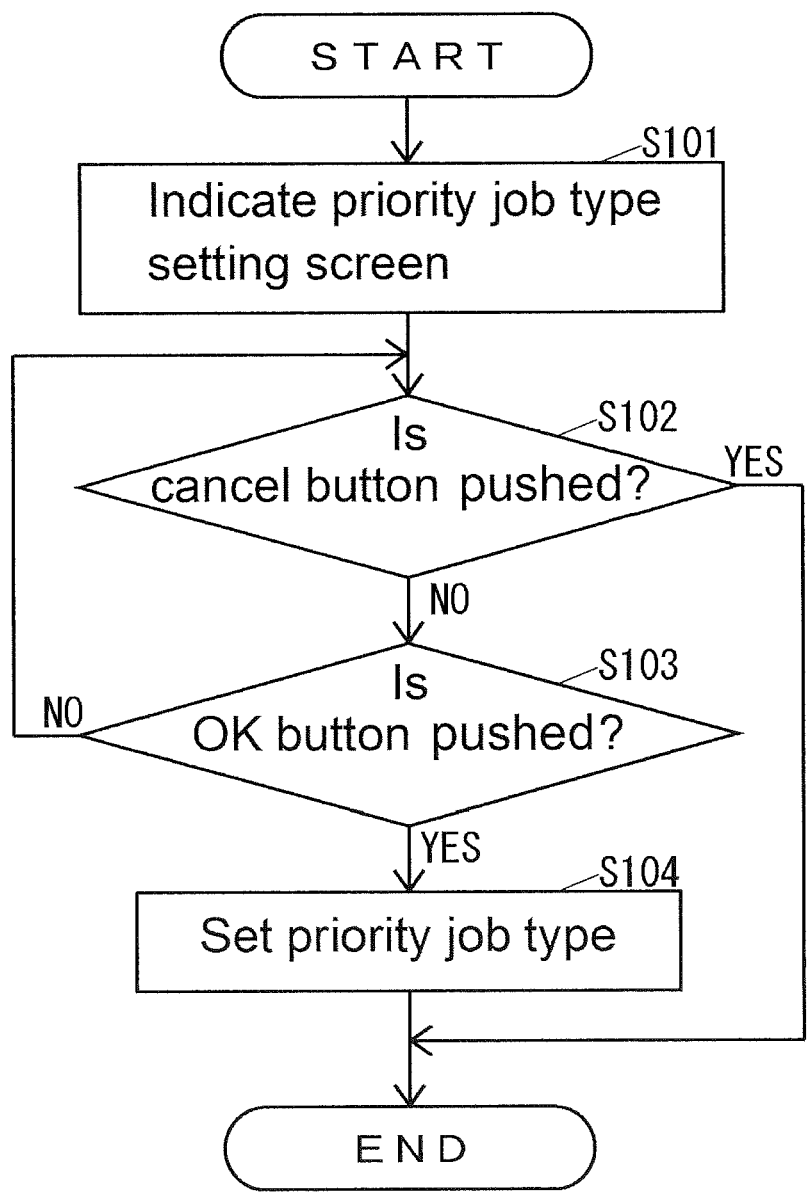
FIG. 4 illustrates an operation of an MFP according to the one embodiment for setting a priority job type.

FIG. 4 illustrates the operation of the MFP 10 for setting the priority job type.

When a start of setting the priority job type is instructed via the operation unit 11, the control unit 20 executes the operation illustrated in FIG. 4.

As illustrated in FIG. 4, the type accepting unit 21c indicates a priority job type setting screen 30 (see FIG. 5) for setting the priority job type on the display 12 (Step S101).

Figure 5:
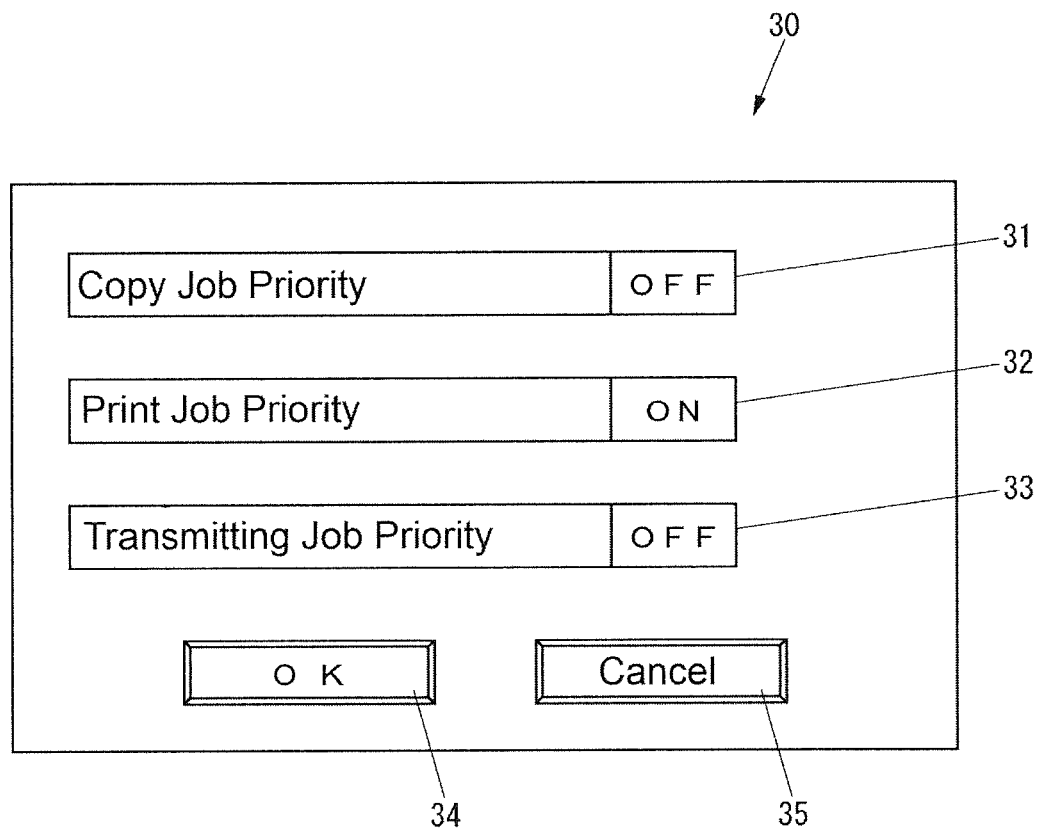
FIG. 5 illustrates an exemplary priority job type setting screen indicated in the operation illustrated in FIG. 4.

FIG. 5 illustrates an exemplary priority job type setting screen 30.

As illustrated in FIG. 5, the priority job type setting screen 30 includes a designation region 31 for designating the copy job as the priority job type, a designation region 32 for designating the print job as the priority job type, a designation region 33 for designating the transmitting job as the priority job type, an OK button 34 for accepting the designations by the designation regions 31 to 33, and a cancel button 35 for aborting the acceptance of the designations by the designation regions 31 to 33.

On the designation region 31, "ON" and "OFF" are switched every time the designation region 31 is pushed. "ON" indicates a state where the copy job is designated as the priority job type. "OFF" indicates a state where the copy job is not designated as the priority job type. While the designation region 31 is described, the same applies to the designation regions 32 and 33.

As illustrated in FIG. 4, the type accepting unit 21c determines whether or not the cancel button 35 is pushed (Step S102).

When the type accepting unit 21c determines that the cancel button 35 is pushed in Step S102, the type accepting unit 21c terminates the operation illustrated in FIG. 4.

When the type accepting unit 21c determines that the cancel button 35 is not pushed in Step S102, the type accepting unit 21c determines whether or not the OK button 34 is pushed (Step S103).

When the type accepting unit 21c determines that the OK button 34 is not pushed in Step S103, the type accepting unit 21c executes the process of Step S102.

When the type accepting unit 21c determines that the OK button 34 is pushed in Step S103, the type accepting unit 21c sets the priority job type on the job priority setting information 17b corresponding to the designations by the designation regions 31 to 33 (Step S104), thus terminating the operation illustrated in FIG. 4.

Next, the operation of the MFP 10 for executing jobs will be described.

Figure 6:
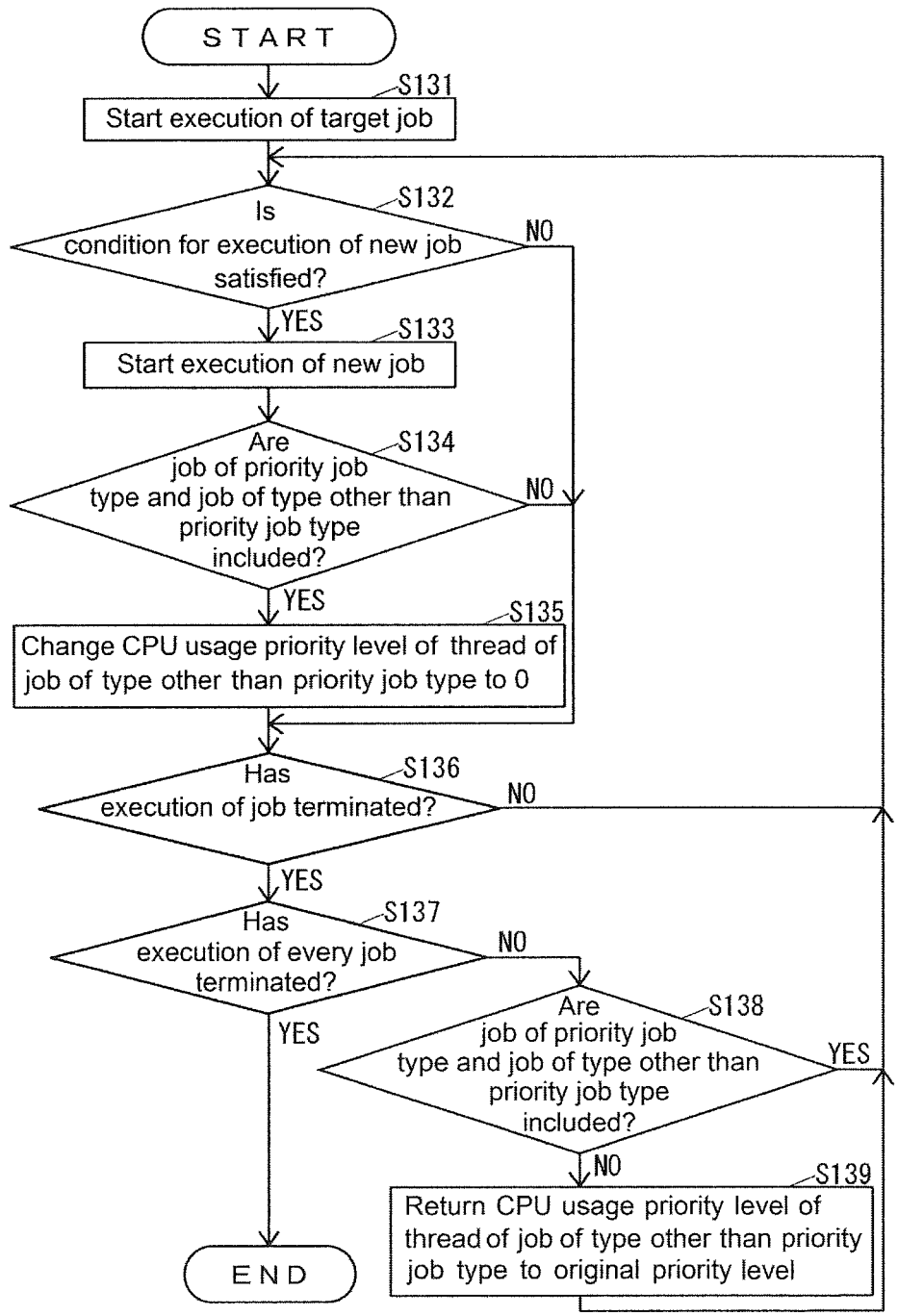
FIG. 6 illustrates an operation of the MFP according to the one embodiment for executing jobs.

FIG. 6 illustrates the operation of the MFP 10 for executing the jobs.

When a condition for executing the job is satisfied by the instruction via the operation unit 11 and the reception of print data via the communication unit 16, the control unit 20 starts the execution of the job. When any job is not executed, the control unit 20 executes the operation illustrated in FIG. 6 in the start of the execution of a job.

As illustrated in FIG. 6, the execution control unit 21b starts the execution of a target job (Step S131). That is, the execution control unit 21b starts the execution of a plurality of threads 21a in the target job in order. Here, when the execution control unit 21b executes the threads 21a in the target job, as described above, the execution control unit 21b sets the CPU usage priority level, set on the CPU usage priority level information on the RAM 23, on the thread 21a in the target job. At the point of the process of Step S131, the content of the CPU usage priority level information on the RAM 23 is identical to the content of the CPU usage priority level information 17c.

After the process of Step S131, the execution control unit 21b determines whether or not a condition for an execution of a new job is satisfied (Step S132).

When the execution control unit 21b determines that the condition for the execution of the new job is satisfied in Step S132, the execution control unit 21b starts the execution of the new job (Step S133). That is, the execution control unit 21b starts the execution of a plurality of threads 21a in the new job in order. Here, when the execution control unit 21b executes the threads 21a in the new job, as described above, the execution control unit 21b sets the CPU usage priority level, set on the CPU usage priority level information on the RAM 23, on the thread 21a in the new job.

After the process of Step S133, the execution control unit 21b determines whether or not a job of the priority job type indicated by the job priority setting information 17b and a job of a type other than the priority job type are both included in the currently executed jobs (Step S134).

When the execution control unit 21b determines that the job of the priority job type and the job of the type other than the priority job type are both included in the currently executed jobs in Step S134, the execution control unit 21b changes the CPU usage priority level of the thread 21a of the job of the type other than the priority job type among the currently executed jobs to 0 on the CPU usage priority level information on the RAM 23 (Step S135). Here, when a job whose CPU usage priority level is required to be changed to 0 is not in execution, the execution control unit 21b performs no process in Step S135, thus terminating the process of Step S135. Relating to the job of the type other than the priority job type among the currently executed jobs, the execution control unit 21b also changes the CPU usage priority level of an additionally executed thread 21a to 0 based on the CPU usage priority level information on the RAM 23 after the execution of the process of Step S135 until the execution of the process of Step S139 described below.

When the execution control unit 21b determines that the condition for the execution of the new job is not satisfied in Step S132, or the execution control unit 21b determines that at least one of the job of the priority job type and the job of the type other than the priority job type is not included in the currently executed jobs in Step S134, or the process of Step S135 has terminated, the execution control unit 21b determines whether or not the execution of any job has terminated (Step S136).

When the execution control unit 21b determines that the execution of any job has terminated in Step S136, the execution control unit 21b determines whether or not the execution of every job has terminated (Step S137).

When the execution control unit 21b determines that the execution of any job has not terminated in Step S137, the execution control unit 21b determines whether or not the job of the priority job type indicated by the job priority setting information 17b and the job of the type other than the priority job type are both included in the currently executed jobs (Step S138).

When the execution control unit 21b determines that at least one of the job of the priority job type and the job of the type other than the priority job type is not included in the currently executed jobs in Step S138, the execution control unit 21b returns the CPU usage priority level of the thread 21a of the job of the type other than the priority job type to the original priority level (Step S139). That is, the execution control unit 21b sets the content of the CPU usage priority level information on the RAM 23 identical to the content of the CPU usage priority level information 17c.

When the execution control unit 21b determines that no execution of any job has terminated in Step S136, or the execution control unit 21b determines that the job of the priority job type and the job of the type other than the priority job type are both included in the currently executed jobs in Step S138, or the process of Step S139 has terminated, the execution control unit 21b executes the process of Step S132.

When the execution control unit 21b determines that the execution of every job has terminated in Step S137, the execution control unit 21b terminates the operation illustrated in FIG. 6.

Figure 7:
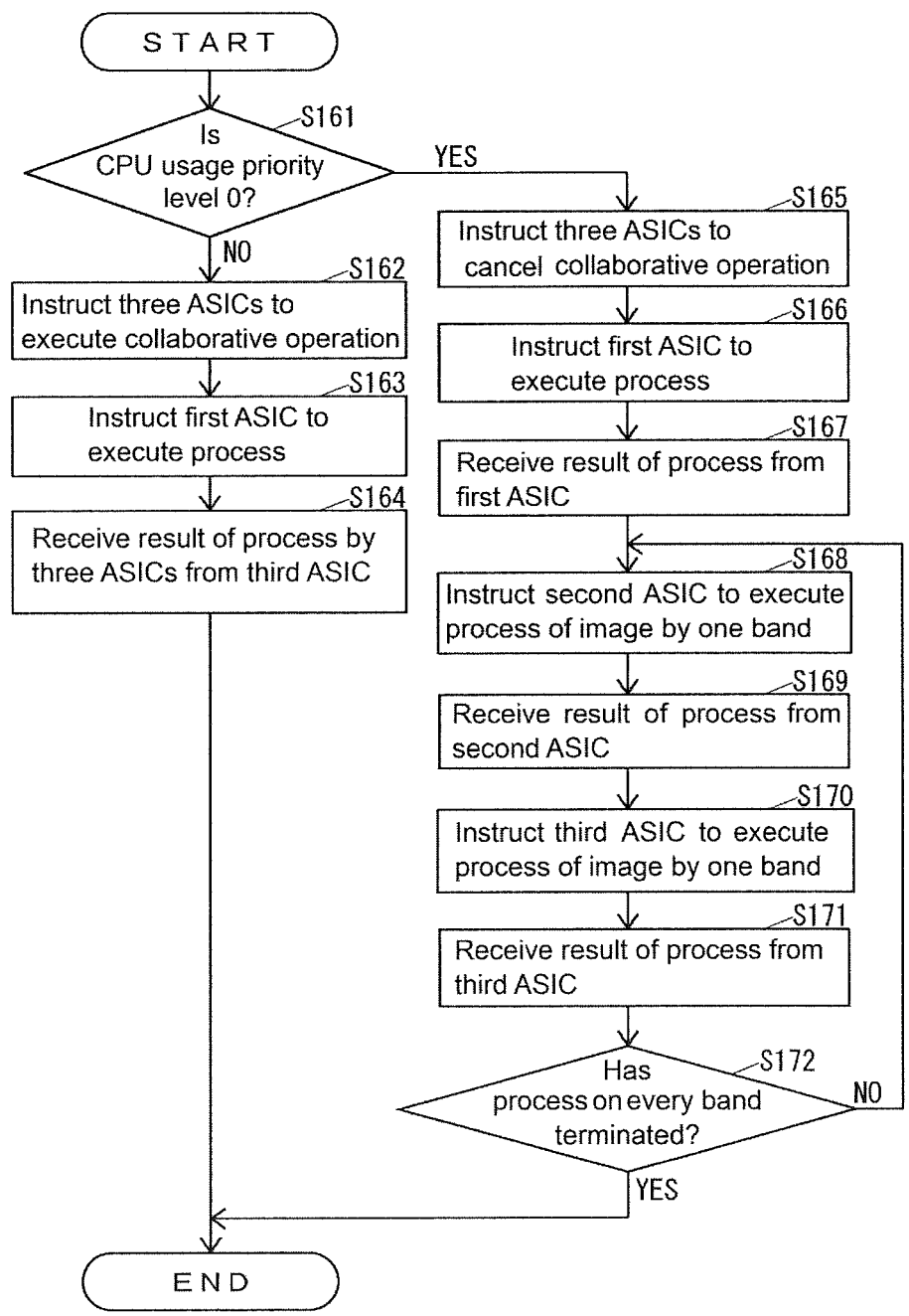
FIG. 7 illustrates an operation of a thread when ASICs according to the one embodiment are used to execute processes.

FIG. 7 illustrates an operation of a thread A when ASICs 24 to 26 are used to execute processes.

When the ASICs 24 to 26 are used to execute the processes, the thread A of the copy job executes the operation illustrated in FIG. 7.

As illustrated in FIG. 7, the thread A determines whether or not the CPU usage priority level of the thread A itself is 0 (Step S161).

When the thread A determines that the CPU usage priority level of the thread A itself is not 0 in Step S161, the thread A instructs the ASICs 24 to 26 to execute a collaborative operation (Step S162), and instructs the ASIC 24 to execute the process (Step S163).

Accordingly, the ASIC 24 executes a process for reading an image from an original document by the scanner 13 and transmits the image read from the original document to the ASIC 25 by each band of the image. Next, the ASIC 25 rotates the image received from the ASIC 24 by each band to change a direction of the image, thus transmitting to the ASIC 26 by each band. Next, the ASIC 26 executes a process of a color conversion on the image received from the ASIC 25. The RAM 23 is used to achieve the delivery and reception of the data between the ASICs 24 to 26.

After the process of Step S163, the thread A receives a result of the process by the collaborative operation of the ASICs 24 to 26, that is, the image on which the color conversion is performed from the ASIC 26 (Step S164), thus terminating the operation illustrated in FIG. 7. The RAM 23 is used to achieve the delivery and reception of the data between the ASIC 26 and the thread A.

When the thread A determines that the CPU usage priority level of the thread A itself is 0 in Step S161, the thread A instructs the ASICs 24 to 26 to cancel the collaborative operation (Step S165), and instructs the ASIC 24 to execute the process (Step S166).

Accordingly, the ASIC 24 executes the process for reading the image from the original document by the scanner 13.

After the process of Step S166, the thread A receives a result of the process by the ASIC 24, that is, the image read from the original document by the ASIC 24 from the ASIC 24 (Step S167). The RAM 23 is used to achieve the delivery and reception of the data between the ASIC 24 and the thread A.

Next, the thread A instructs the ASIC 25 to execute the process of the image, received in Step S167, by one band (Step S168). The RAM 23 is used to achieve the delivery and reception of the data between the thread A and the ASIC 25.

Accordingly, the ASIC 25 rotates the image of one band received from the thread A to change the direction of the image.

After the process of Step S168, the thread A receives a result of the process by the ASIC 25, that is, the image of one band whose direction is changed by the ASIC 25 from the ASIC 25 (Step S169). The RAM 23 is used to achieve the delivery and reception of the data between the ASIC 25 and the thread A.

Next, the thread A instructs the ASIC 26 to perform the process of the image by one band received in Step S169 (Step S170). The RAM 23 is used to achieve the delivery and reception of the data between the thread A and the ASIC 26.

Accordingly, the ASIC 26 executes the process of the color conversion on the image of one band received from the thread A.

After the process of Step S170, the thread A receives a result of the process by the ASIC 26, that is, the image of one band on which the color conversion is performed by the ASIC 26 from the ASIC 26 (Step S171). The RAM 23 is used to achieve the delivery and reception of the data between the ASIC 26 and the thread A.

Next, the thread A determines whether or not the process on every band of the image received in Step S167 has terminated (Step S172).

When the thread A determines that the process on at least a part of the band has not terminated in Step S172, the thread A executes the process of Step S168 on the band on which the process has not terminated.

When the thread A determines that the process on every band has terminated in Step S172, the thread A terminates the operation illustrated in FIG. 7.

Figure 8:
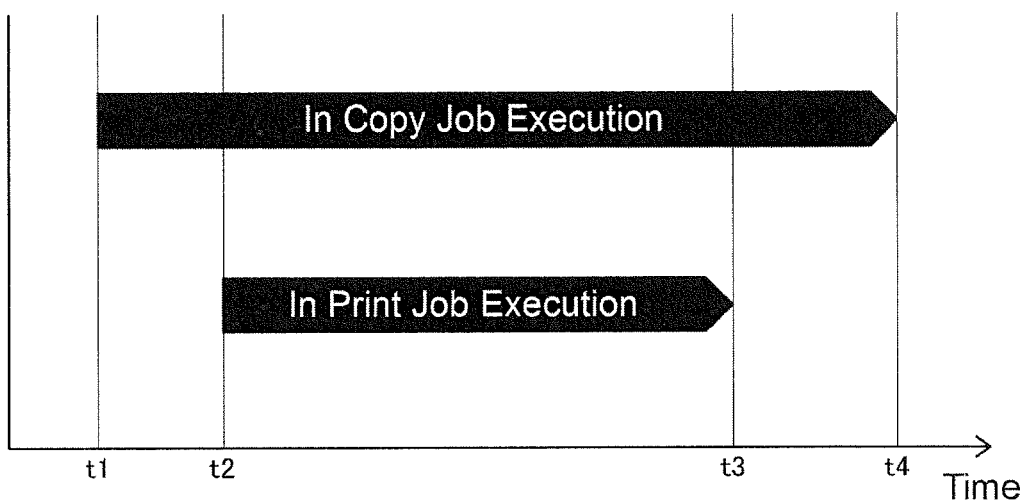
FIG. 8 illustrates an example when a print job is executed while a copy job is executed in the MFP according to the one embodiment.

The following describes an exemplary case where, as illustrated in FIG. 8, the print job is executed during the execution of the copy job when the priority job type is the print job.

In FIG. 8, a time t1 is a time when the execution of the copy job starts. A time t2 is a time when the execution of the print job starts. A time t3 is a time when the execution of the print job terminates. A time t4 is a time when the execution of the copy job terminates.

Figure 9:
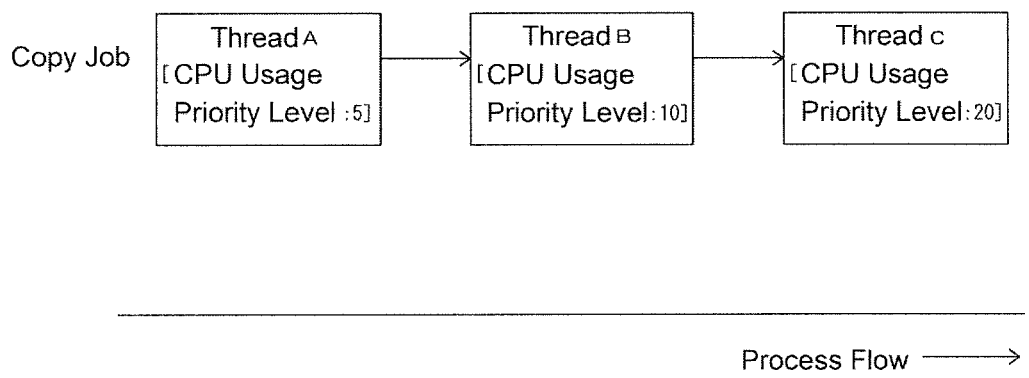
FIG. 9 illustrates exemplary threads according to the one embodiment when only the copy job is executed.
Figure 10:
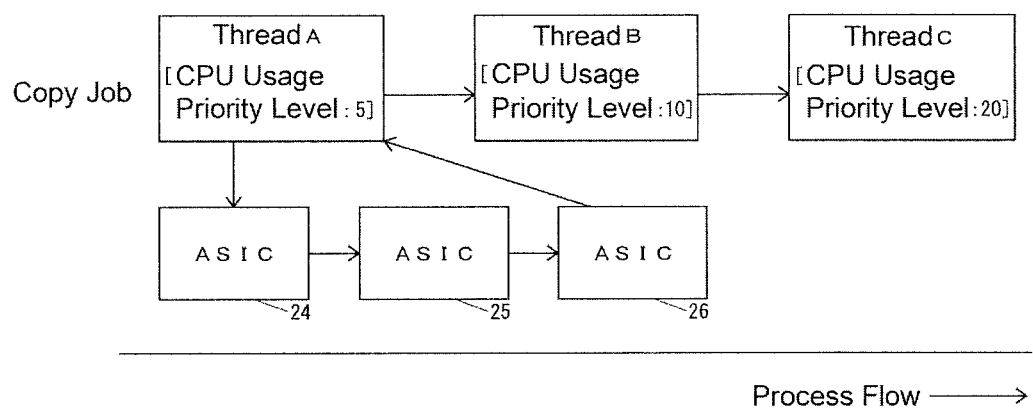
FIG. 10 illustrates a relation between the threads and the ASICs in the state illustrated in FIG. 9.

First, from the time t1 to the time t2, only the copy job is executed by the process of Step S131 as illustrated in FIG. 9. At this time, since the CPU usage priority level of the thread A is 5 (NO, in Step S161), the collaborative operation of the ASICs 24 to 26 is executed by the processes of Steps S162 to S164 as illustrated in FIG. 10.

Figure 11:
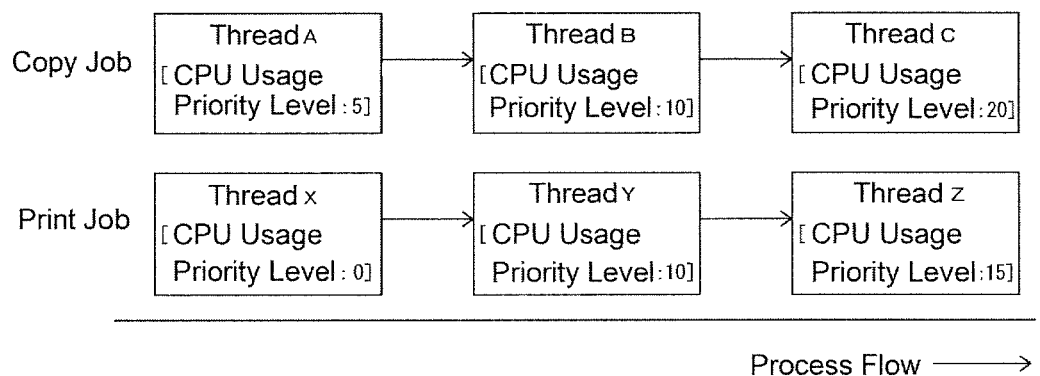
FIG. 11 illustrates exemplary threads according to the one embodiment before a CPU usage priority level of the copy job is changed when the copy job and the print job are executed.
Figure 12:
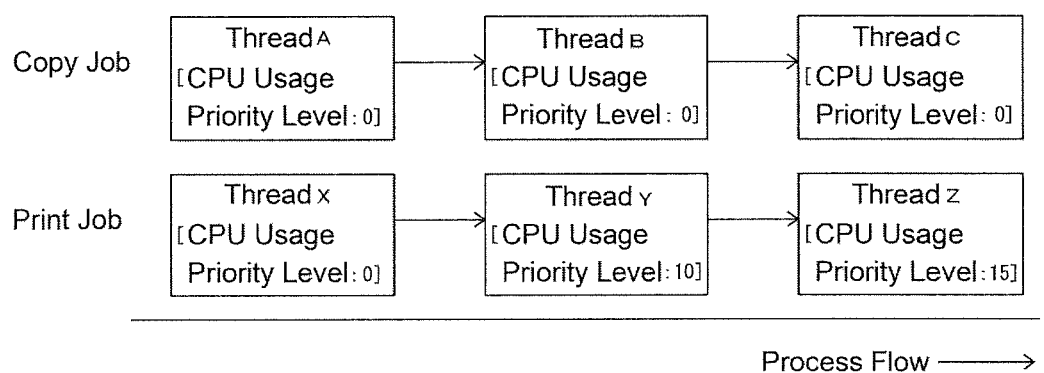
FIG. 12 illustrates exemplary threads according to the one embodiment after the CPU usage priority level of the copy job is changed when the copy job and the print job are executed.
Figure 13:
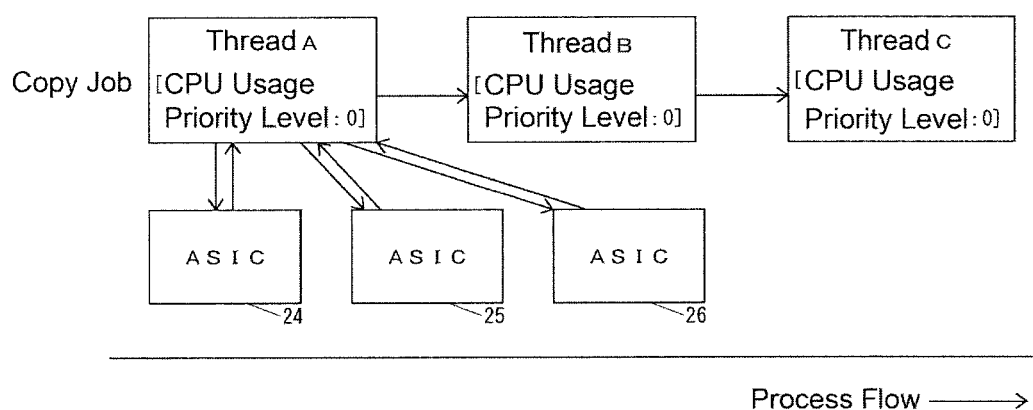
FIG. 13 illustrates a relation between the threads and the ASICs in the state illustrated in FIG. 12.

Next, from the time t2 to the time t3 illustrated in FIG. 8, first, the print job is executed by the process of Step S133 as illustrated in FIG. 11. Then, since the print job as the job of the priority job type and the copy job as the job of the type other than the priority job type both exists (YES, in Step S134), as illustrated in FIG. 12, the CPU usage priority levels of the threads 21a, that is, the threads A to C of the copy job as the job of the type other than the priority job type are changed to 0 (Step S135). At this time, since the CPU usage priority level of the thread A is 0 (YES, in Step S161), the processes of Steps S165 to S172 cancel the collaborative operation of the ASICs 24 to 26 to execute the process as illustrated in FIG. 13.

Next, from the time t3 to the time t4, again, only the copy job is executed as illustrated in FIG. 9. At this time, since the process of Step S139 returns the CPU usage priority level of the thread A to 5 (NO, in Step S161), the processes of Steps S162 to S164 executes the collaborative operation of the ASICs 24 to 26 as illustrated in FIG. 10.

As described above, when the ASICs 24 to 26 are used to execute the processes, in a case where the CPU usage priority level exceeds 0 (NO, in Step S161), the MFP 10 causes the ASICs 24 to 26 to execute the collaborative operation (Step S162), instructs the ASIC 24 to execute the process (Step S163), and receives the result of the process by the collaborative operation from the ASIC 26 (Step S164). This ensures the MFP 10 to receive the result of a high speed process by the collaborative operation of the ASICs 24 to 26 at high speed after the instruction of the execution of the process to the ASIC 24.

When the ASICs 24 to 26 are used to execute the processes, in a case where the CPU usage priority level is 0 (YES, in Step S161), the MFP 10 cancels the collaborative operation of the ASICs 24 to 26 (Step S165), instructs the respective ASICs 24 to 26 to execute the processes (Steps S166, S168, and S170), and receives the results of the processes from the respective ASICs 24 to 26 (Steps S167, S169, and S171). This ensures the MFP 10 to reduce the generation of the error of the capacity shortage of the RAM 23 due to the excessive accumulation of the results of the processes by the ASICs 24 to 26 in the RAM 23, even if the MFP 10 cannot receive the results of the processes by the ASICs 24 to 26 at high speed because of low CPU usage priority levels.

Accordingly, the MFP 10 can appropriately use the ASICs 24 to 26 corresponding to the CPU usage priority levels to execute the processes.

When the ASICs 24 to 26 are used to execute the processes, in a case where the CPU usage priority level is 0, the MFP 10 instructs the ASICs 25 and 26 to execute the process on the image in band units (Steps S168 and S170). This ensures the MFP 10 to reduce the generation of the error of the capacity shortage of the RAM 23 due to the excessive accumulation of the results of the processes by the ASICs 24 to 26 in the RAM 23. Thus, the MFP 10 can execute the processes of the image in a small unit (in band units in this case) compared with a unit of the image on which any of the plurality of hardware units (the ASICs 24 to 26 in this case) is instructed to execute a process in a case where the processor usage priority level exceeds the specific priority level (0 in this case).

In Step S135, the MFP 10 changes the CPU usage priority level to 0 as the lowest priority level in a settable range. This configuration causes the MFP 10 to instruct the respective ASICs 24 to 26 to execute the processes and to receive the results of the processes from the respective ASICs 24 to 26 only when a speed to instruct the ASICs 24 to 26 to execute the processes and a speed to receive the results of the processes by the ASICs 24 to 26 are lowest. This ensures the MFP 10 to reduce an unnecessarily decrease of the speed of the execution of the processes.

When the job of the priority job type and the job of the type other than the priority job type are simultaneously executed (YES, in Step S134), the MFP 10 decreases the CPU usage priority level of the job of the type other than the priority job type (Step S135). This ensures the MFP 10 to execute a job of specific type with priority.

In Step S135, the MFP 10 decreases the CPU usage priority level to the lowest priority level in the settable range, that is, 0. Accordingly, the MFP 10 decreases the execution speed of the job of the type other than the priority job type to lowest, thus executing the job of the priority job type with precise priority.

The MFP 10 accepts the designation of the job type to be executed with priority (Step S104), thus executing a job of a type desired by a user with priority.

When the job of the priority job type and the job of the type other than the priority job type are no longer executed simultaneously (NO, in Step S138), the MFP 10 returns the CPU usage priority level of the job whose CPU usage priority level has been decreased (Step S139). This ensures the MFP 10 to reduce an unnecessarily delay of the termination time of the execution of the job of the type other than the priority job type.

In the embodiment, the MFP 10 includes the plurality of the CPUs 21 as processors of the disclosure. Accordingly, the MFP 10 can increase the number of simultaneously processable threads 21a, thus increasing the speed of the execution of the processes as the entire MFP 10. The MFP 10 may include a multi-core processor with a plurality of CPU cores as the processor of the disclosure, or may include only one CPU 21 as the processor of the disclosure.

While the electronic device of the disclosure is the MFP in the embodiment, the electronic device may be an image forming apparatus, for example, a printer-only machine, a scanner-only machine, a copy-only machine, other than the MFP, or may be an electronic device, for example, a PC other than the image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device, comprising:
a Central Processing Unit (CPU);
a storage unit that stores a process execution program, and
   a plurality of hardware units as Application Specific Integrated Circuits (ASICs) that execute a specific process,
the CPU executing the process execution program to function as:
   a plurality of process execution units as threads that use the CPU to execute a process; and
   an execution control unit that controls executing of the process by the plurality of process execution units,
   wherein the execution control unit sets a CPU usage priority level for each of the plurality of process execution units,
   for each of the plurality of process execution units of the process, when the CPU usage priority level for a process execution unit of the process exceeds a specific priority level in a case where the plurality of hardware units are used to execute the process execution unit, cause the plurality of hardware units to execute a collaborative operation for the process execution unit, by instructing two or more of the plurality of hardware units to execute in sequence, wherein the results of the first hardware unit are passed to the second hardware unit for further processing and at the end of the collaborative operation the results are received from the final hardware unit, for each of the plurality of process execution units of the process, when the CPU usage priority level for a process execution unit of the process is equal to or less than the specific priority level, in a case where the plurality of hardware units are used to execute the process execution unit, i) cancel the collaborative operation, ii) instruct each of the plurality of hardware units to execute their specific process not in sequence, and iii) separately receive the result of their specific process from each of the plurality of hardware units.

2. The electronic device according to claim 1,
wherein the plurality of hardware units execute processes of an image;
the plurality of process execution units, when the CPU usage priority level is equal to or less than the specific priority level in a case where the plurality of hardware units are used to execute the process, instruct at least one of the plurality of hardware units to execute the process of the image in a small unit compared with a unit of the image on which any of the plurality of hardware units is instructed to execute the process in a case where the CPU usage priority level exceeds the specific priority level.

3. The electronic device according to claim 1,
wherein the specific priority level is a lowest priority level in a settable range.

4. The electronic device according to claim 1,
wherein the electronic device executes a plurality of types of a job, and
the execution control unit changes the CPU usage priority level of the job of a type other than a specific type to a priority level that is equal to or less than the specific priority level, when the job of the specific type and the job of the type other than the specific type are simultaneously executed.

5. The electronic device according to claim 3,
wherein the CPU executes the process execution program to further function as a type accepting unit that accepts a designation of the specific type.

6. The electronic device according to claim 3,
wherein the execution control unit, when the job of the specific type and the job of the type other than the specific type are no longer executed simultaneously, returns the CPU usage priority level of the job whose CPU usage priority level has been changed to the priority level before changing.

* * * * *